(12) United States Patent
Helms et al.

(10) Patent No.: US 7,988,346 B2
(45) Date of Patent: Aug. 2, 2011

(54) ALL-LED VISIBLE LIGHT AND IR LIGHT HEADLAMP

(75) Inventors: James M. Helms, N. Fort Myers, FL (US); Mark R. Barie, Glenshaw, PA (US); John A. Lowrey, III, Saxonburg, PA (US)

(73) Assignee: Ibis Tek, LLC, Butler, PA (US)

( * ) Notice: Subject to any disclaimer, the term of this patent is extended or adjusted under 35 U.S.C. 154(b) by 386 days.

(21) Appl. No.: 12/383,065

(22) Filed: Mar. 19, 2009

(65) Prior Publication Data

US 2010/0109531 A1   May 6, 2010

Related U.S. Application Data

(60) Provisional application No. 61/038,867, filed on Mar. 24, 2008.

(51) Int. Cl.
*B60Q 1/00* (2006.01)

(52) U.S. Cl. .......................... 362/545; 362/373; 362/546

(58) Field of Classification Search .................. 362/544, 362/547, 523, 543, 545, 546, 548, 362, 373, 362/372; 315/76, 77, 82, 83
See application file for complete search history.

(56) References Cited

U.S. PATENT DOCUMENTS

| | | | |
|---|---|---|---|
| 7,427,152 B2 * | 9/2008 | Erion et al. | 362/547 |
| 7,621,664 B2 * | 11/2009 | Nicolai | 362/547 |
| 7,922,349 B2 * | 4/2011 | Hunnewell et al. | 362/157 |

* cited by examiner

*Primary Examiner* — David Hung Vu
(74) *Attorney, Agent, or Firm* — Karen Tang-Wai Sodini (57) ABSTRACT

A headlamp for a vehicle (air, land or sea) providing a planar array of infrared (IR) light-emitting diodes (LEDs) and visible light LEDs, and arranged and mounted within a housing so as to provide for cooling of the LEDs without forced convection, by conducting heat from the LEDs to protruding cooling fins. A switch system is also provided, for enabling either the visible light or the infrared light, and for selecting a high-beam or low-beam pattern. The beam pattern is provided in some embodiments so as to meet US Federal Motor Vehicle standards.

11 Claims, 10 Drawing Sheets

ALL-LED VISIBLE LIGHT AND IR LIGHT HEADLAMP

CROSS REFERENCE TO RELATED APPLICATIONS

Reference is made to and priority claimed from U.S. provisional application Ser. No. 61/038,867 filed on Mar. 24, 2008.

FIELD OF THE INVENTION

The present invention pertains to the field of electric illumination. More particularly, the present invention pertains to the field of electric lights with variable beam settings that use light-emitting diodes (LEDs) to provide visible light and infrared (IR) light, for use as headlamps for land, air or sea-going vehicles.

BACKGROUND OF THE INVENTION

The sealed beam headlamps that have been used in tactical military vehicles for many years exhibit poor performance characteristics when compared to current automotive lighting systems. A common headlamp used in tactical military vehicles is an incandescent, sealed beam headlamp. The MMPV (Medium Mine Protected Vehicle), as well as other military vehicles such as the HMMWV (High Mobility Multipurpose Wheeled Vehicle), currently use a headlamp that is interchangeable with a headlamp system specified in MIL-DTL-14465E (12 Aug. 1998), attached hereto, called a vehicular composite light assembly, including a first incandescent bulb lamp providing a high beam and a low beam, and a second incandescent bulb lamp also providing a high beam and a low beam, but covered by a filter so as to pass only infrared light. An operator switches from visible to infrared illumination, and thus engages one or the other of the bulbs, and then selects high beam or low beam, as needed. The headlamp system can be provided as a quick detachable or as a bolt-down model. (MIL-DTL-14465E indicates it is a specification for tracked vehicles, but the specification is also for headlamp systems used in non-tracked vehicles also). These headlamps produce on average up to 75,000 cd (candela), and 100 m (meter) visibility at 2 lx (lux). The color temperature for incandescent headlamps is about 3000 K, giving the light a warm yellowish appearance.

Military "blackout" operations present greater challenges: the vehicle must be operated at night at a moderately high speed without being detected by enemy forces. Traditional blackout lights deployed on tactical military vehicles provide a small amount of visible light illumination directly in front of the vehicle bumper. Many operators consider this ineffective especially when driving at higher speeds. Night vision goggles (NVGs) and infrared lighting significantly improve low-light and blackout operations, but NVGs used without providing any sort of illumination are generally considered inadequate for such operations.

The general consensus is that it is highly advantageous to provide infrared (IR) illumination in a field of view, rather than relying on infrared produced by objects in the field of view, as this dramatically increases the effectiveness of even lower-performing NVGs. IR illumination is often produced from an incandescent lamp using a blackout filter/lens that passes only IR radiation from the incandescent lamp. IR illumination produced in this fashion is inefficient, since the lamp still produces visible light, and only a small portion of the radiation produced by the lamp is passed as IR. Additionally, blocking all visible light is difficult, and the filter/lens must be mechanically moved into place, resulting in an unacceptable conversion time to switch between visible and infrared illumination mode.

What is needed is a headlamp that is economical, that provides both visible light and IR illumination, both of sufficient intensity for vehicle operation (at night) at reasonable speeds, with the ability to switch from visible to IR light in an acceptable time, and with a thermal management system and headlight aiming mechanism.

SUMMARY OF THE INVENTION

The invention provides an all light-emitting diode (LED) headlamp system (as opposed to a headlamp system that includes other kinds of light sources, such as incandescent lights or halogen lights) for use as a ground, air or sea-going vehicle headlamp, configurable for high beam or low beam operation, using visible light or infrared light, and relying on only conduction and radiation for dissipating heat from the LEDs.

BRIEF DESCRIPTION OF THE DRAWINGS

The above and other objects, features, and advantages of the invention will become apparent from a consideration of the subsequent detailed description presented in connection with the accompanying drawings, in which.

DRAWINGS LIST OF REFERENCE NUMERALS

The following is a list of reference labels used in the drawings to label components of different embodiments of the invention, and the names of the indicated components.

10 heat sink
12 LED-substrate
14 LED (with primary lens)
16 secondary lens molded into protective cover
20 all LED white and IR light headlamp or headlamp system
22 housing or headlamp "can"
22a housing top component
22b housing base component 22c front side of base component
22d back side of base component with cooling fin elements
22e second housing base component
22f cooling fin elements
22g cup shaped back housing element or ball portion
24 first gasket
26 protective cover
28 planar array of LEDs
29 second planar array of LEDs
30 second gasket
34 fastener
40 high beam visible light LED and lens integrated unit
40a first high beam visible light LED/lens assembly
40b second high beam visible light LED/lens assembly
40c lens (high beam)
40d a plurality of dies serving as a single LED light source
41 low beam visible light LED and lens integrated unit
41a first low beam visible light LED/lens assembly
41b second low beam visible light LED/lens assembly
41c lens (low beam)
42 high beam IR LED and lens integrated unit
42a first high beam IR LED/lens assembly
42b second high beam IR LED/lens assembly
42c lens (high beam IR)
44 low beam IR LED and lens integrated unit
44a low beam IR LED/lens assembly
44c lens (low beam IR)
46a fill light used with low beam white light
46b fill light used with high and low beam white light
46c fill light used with high beam white light
46d cylindrical lens for fill light
50 aiming mechanism
52 adaptor plate
54 spring
56 aiming screw
58 hole/socket portion
60 wiring harness
62 IR filter

DETAILED DESCRIPTION

Referring to FIGS. 1-10, the invention provides a headlamp 20 forming what is here called an all-LED visible and infrared light headlamp system for use as a land or air or sea-going vehicle headlamp.

One embodiment of a headlamp according to the invention is shown in FIGS. 1-2, 5-8, the headlamp comprising a headlamp "can" or housing 22 having a top component 22a fastened by a plurality of fasteners 34 to a base component 22b. Sandwiched between the top and base components are a first gasket 24 directly adjacent to the top component 22a, a protective cover 26 adjacent to the first gasket 24 and located directly in front of a planar array 28 consisting of a plurality of LED-lens units 40 41 42 44 (FIG. 7), each such unit comprising a lens-less or bare light-emitting diode (LED) (not separately shown) and a lens attached thereto forming one assembly 40 or 41 or 42 or 44, the assembly mounted to an LED-substrate 12. The LED-lens units 40 41 42 44 are thermally bonded to the LED-substrate 12, the substrate comprising an aluminum printed circuit board. The planar array 28 provides at least one LED-lens unit providing visible light 40 41 and at least one of the remaining LED-lens units providing IR light 42 44. For high beam operation, a lens to achieve a more collimated beam is used in the LED-lens unit. For low beam light, a lens producing a less collimated beam is used in the LED-lens unit. Behind and adjacent to the array 28 is a second gasket 30 resting directly inside a diameter of a front side 22c of the base component 22b. Thermal compound, or what is sometimes called thermal grease, is applied to the back of the LED-substrate 12 to allow heat from the LEDs to flow from the LEDs, to the LED-substrate 12, to the housing 22, and finally to a plurality of protruding cooling fins 22f. There is no forced convection of the heat generated.

In the embodiment shown more particularly in FIGS. 1, 2, 5 and 8, a back side 22d of the base component 22b features the plurality of the protruding cooling fin elements 22f for dissipating heat generated by the operational LEDs. In the embodiment of the invention shown more particularly in FIG. 3, a heat sink 10 for dispersion of heat generated by the operational LEDs is inserted into a second housing base component 22e before the top component 22a is fastened to the housing back component 22e. In yet another embodiment (FIG. 10) the protruding cooling fin elements 22f are located around the periphery of the base component 22b rather than on the back side 22d of the base component 22d.

Figure 1:
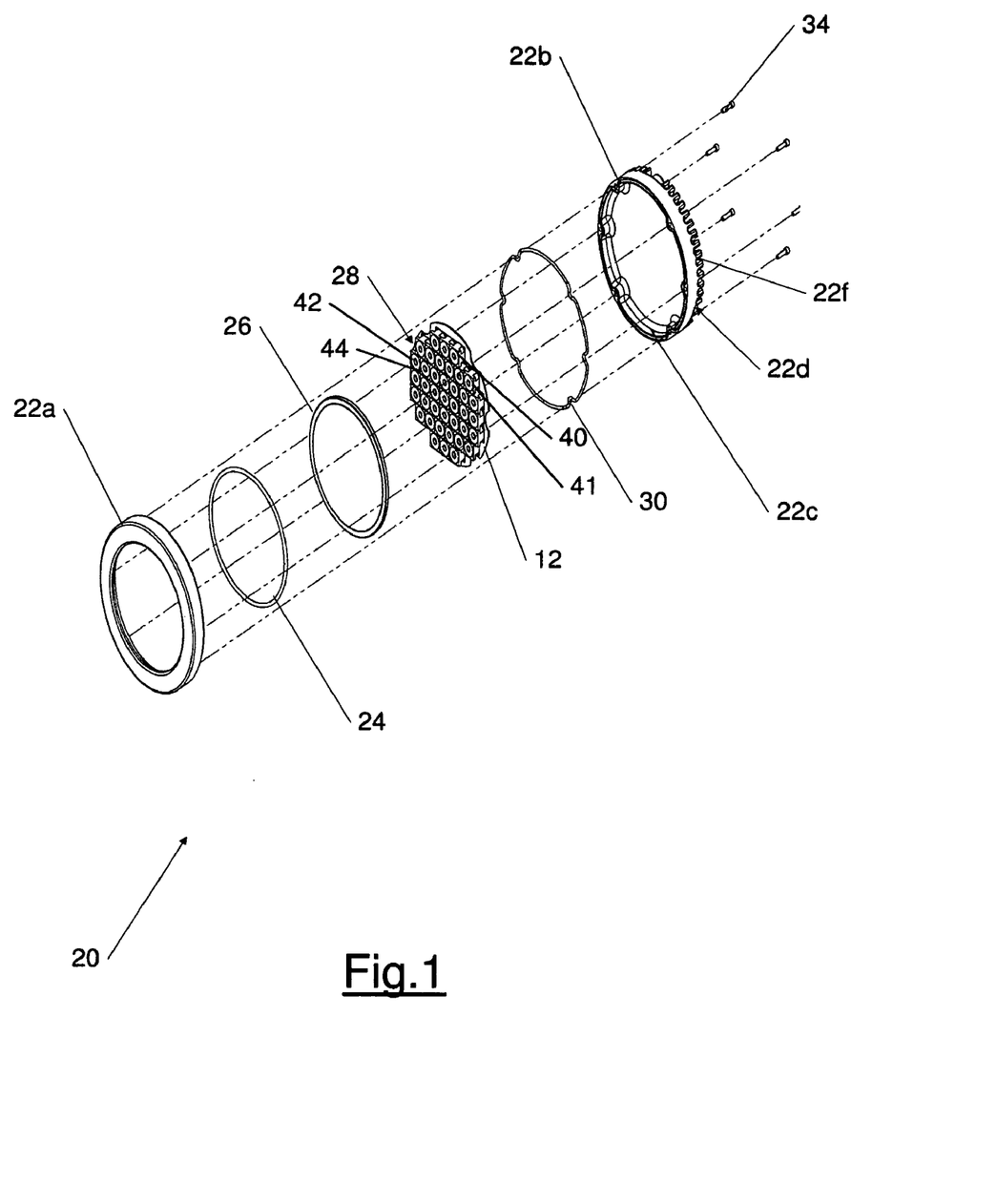
FIG. 1 is an exploded perspective view of an all LED visible light and IR light headlamp system according to the invention.
Figure 2:
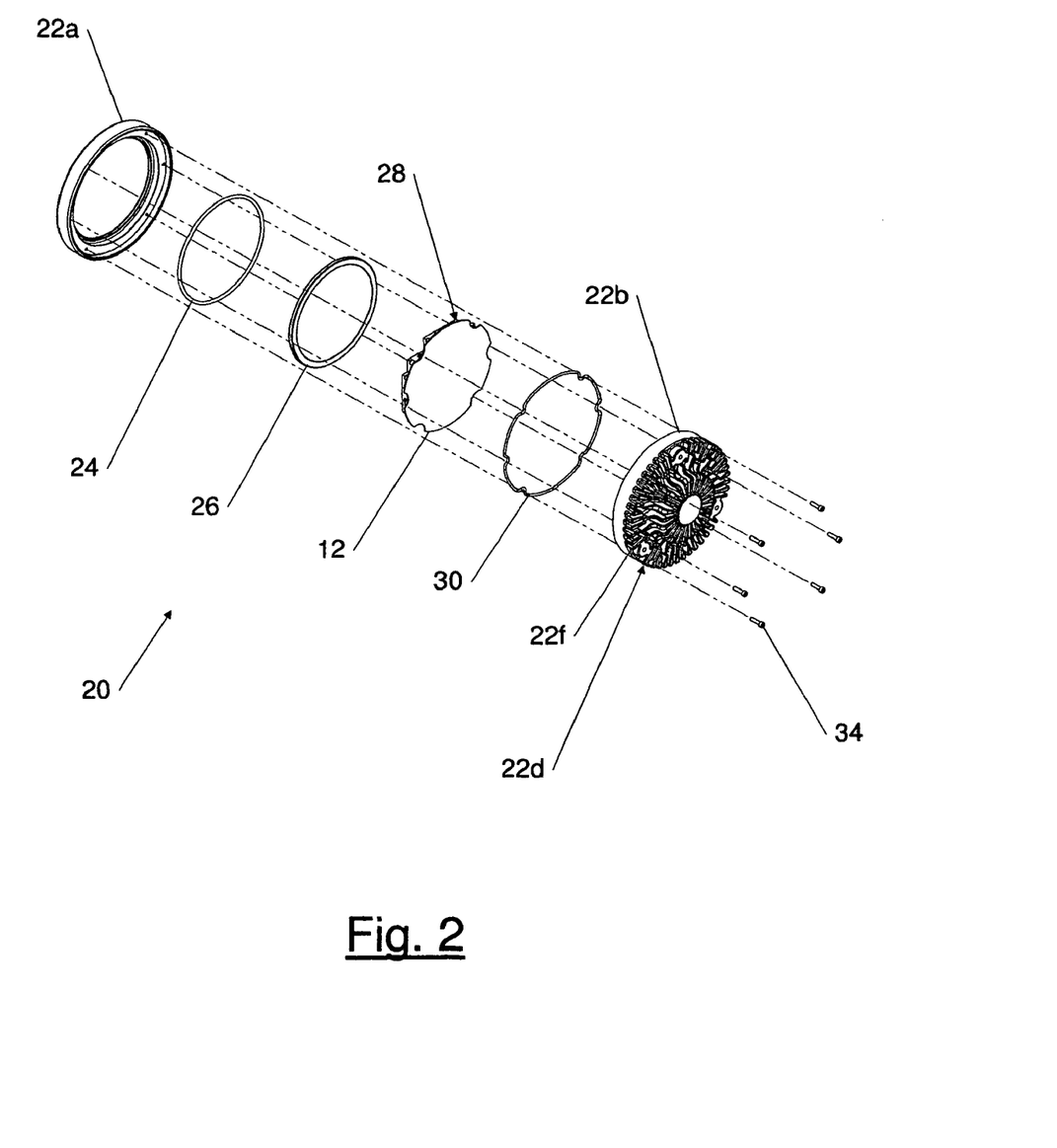
FIG. 2 is an exploded perspective view showing the back of the headlamp system of FIG. 1.
Figure 3:
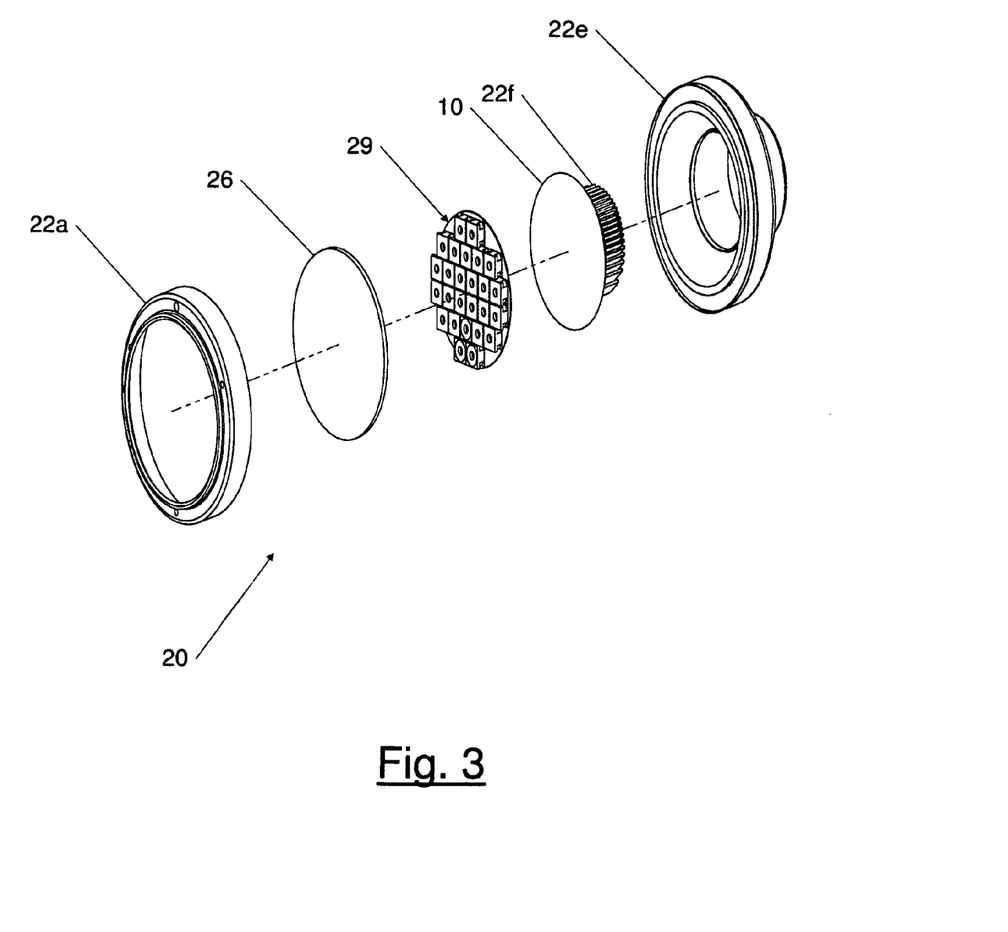
FIG. 3 is an exploded perspective view of another embodiment of the headlamp system according to the invention.
Figure 4:
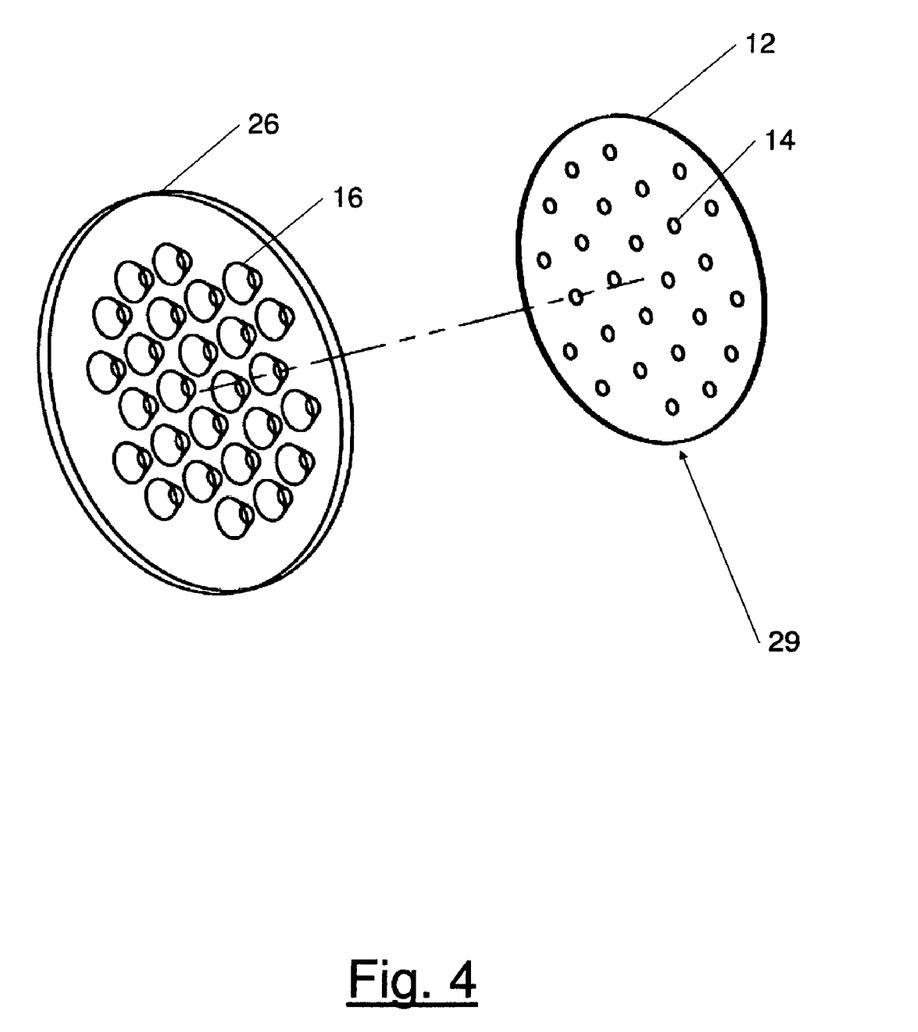
FIG. 4 is an exploded perspective view of a protective cover with integral lenses and an LED substrate with an LED array.
Figure 5:
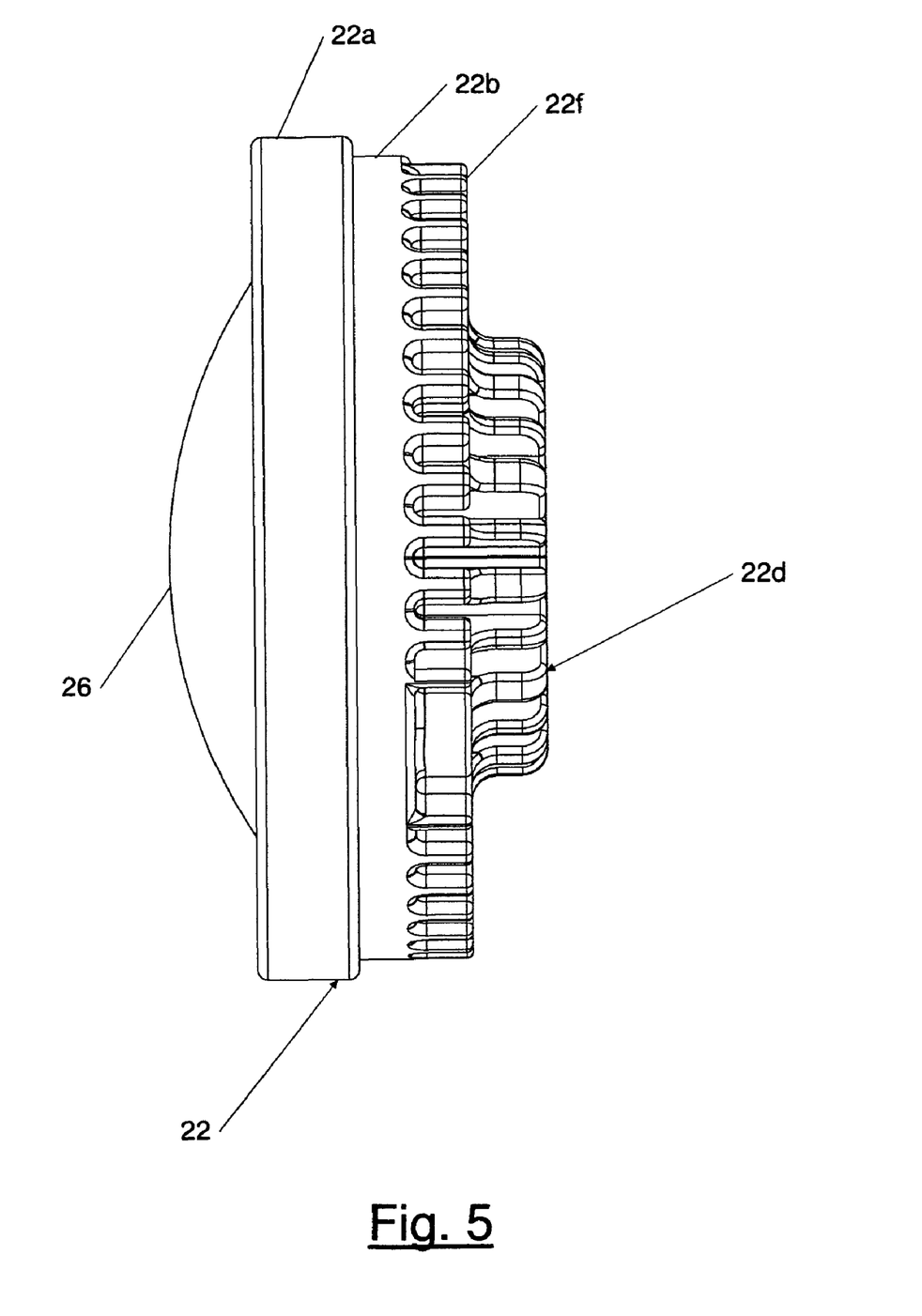
FIG. 5 is a side view of an embodiment of a headlamp system according to the invention.

Referring specifically to the embodiment shown more particularly in FIG. 4, a second planar array 29 is provided as a plurality of lens-bearing LEDs 14, i.e. an LED having a lens attached directly thereto and integral therewith, attached to the LED-substrate 12, and respective individual secondary lenses 16 molded into the protective cover 26. Each secondary lens 16 is molded into the cover 26 and works in conjunction with the primary lens of each individual LED 14 to shape light into a desired beam pattern. In contrast, in the embodiments illustrated more particularly in FIGS. 1, 6 and 7, the LEDs used in the LED-lens units 40 41 42 44 are bare LEDs lacking what is here called a primary lens, in that there is no lens provided by the lens manufacturer as integral with the bare LED, with a small standoff (on the order of at most a few millimeters) from the bare LED.

Figure 10:
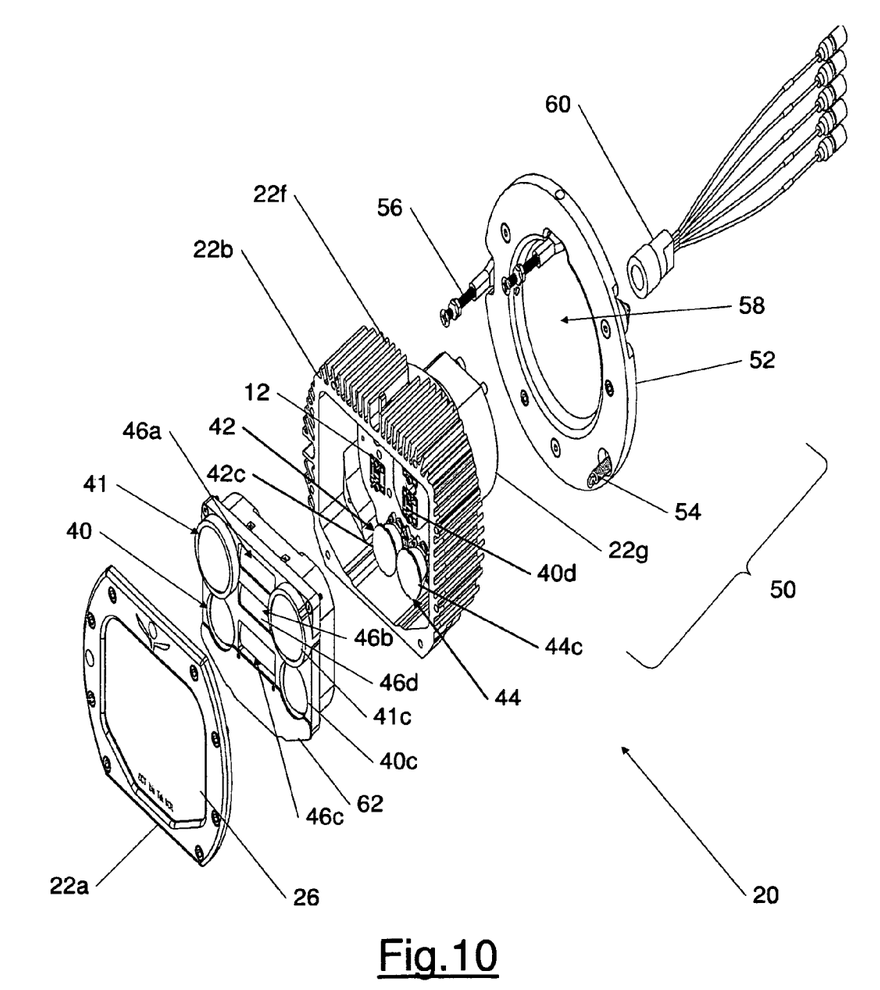
FIG. 10 is an exploded view of an embodiment of a headlamp system according to the invention having an aiming mechanism.

Referring now to FIG. 10, in still another, third embodiment, an LED light source is provided by a plurality of so-called dies 40d thermally bonded to the LED-substrate 12. The light from the plurality of dies 40d is formed into a beam using a single lens 40c 41c 42c 44c 46d, visible as the outermost component of the LED-lens units 40 41 42 44 at an appropriate standoff from the dies 40d. Thus, each LED-lens unit 40 41 42 44 comprises a plurality of dies 40d and a single lens 40c 41c 42c 44c 46d, the lens selected to produce a desired beam pattern.

Figure 7:
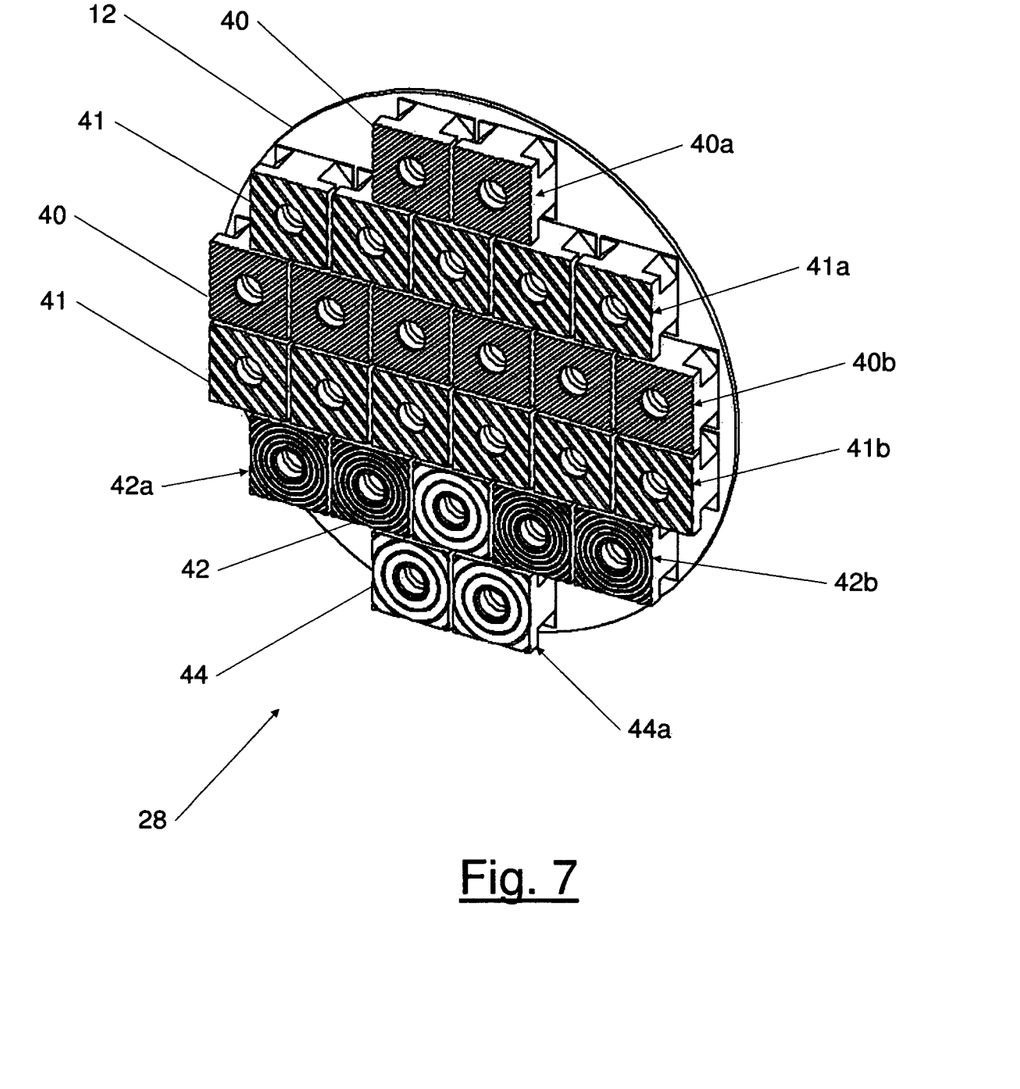
FIG. 7 is a perspective view of an LED array for another embodiment of a headlamp system according to the invention.
Figure 8:
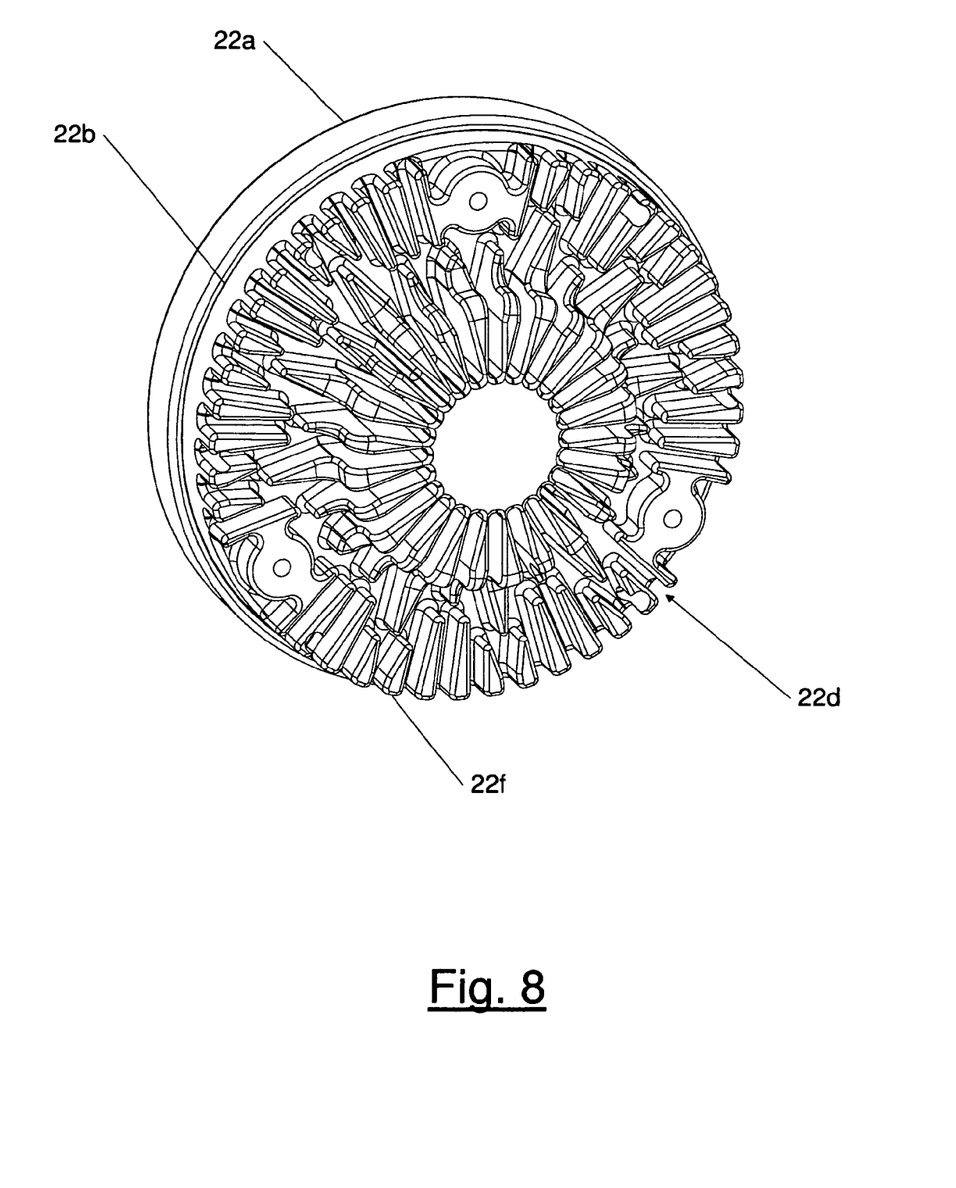
FIG. 8 is a perspective view of the back of the base component holding the LEDs in the embodiment of the invention shown in FIG. 1.
Figure 9:
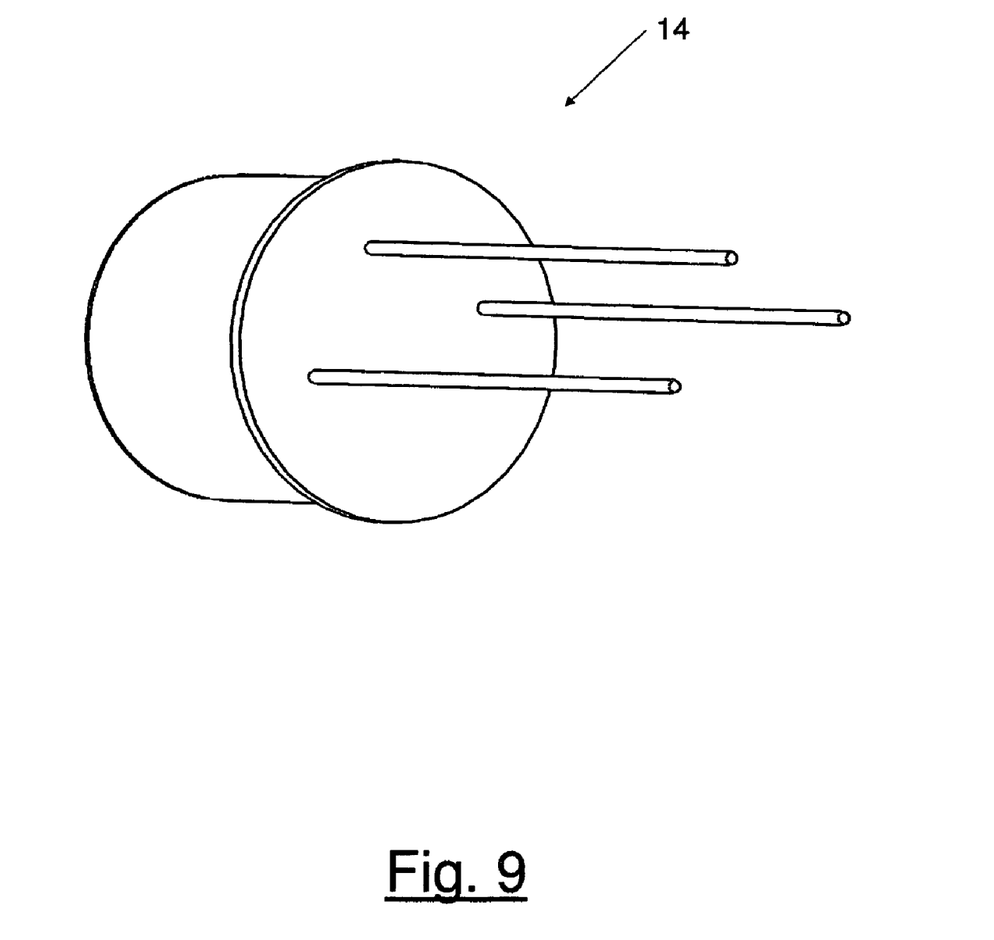
FIG. 9 is a perspective view of an LED featuring a primary lens, used by some embodiments of the invention.

Referring now especially to FIG. 7, in an illustrative layout of LEDs 40 41 42 44 on an LED mounting substrate 12, the LED array 28 includes a first high-beam visible-light LED assembly 40a comprising of two visible-light LED-lens units 40 disposed closest to the perimeter of the LED-substrate 12, and a second high-beam visible-light LED assembly 40b of six visible-light LED-lens units 40 disposed along a line nearer the center of the substrate 12, a line that lies approximately along a diameter of the substrate 12. The LED array also includes two assemblies of low-beam visible-light LED-lens units 41, a first assembly 41a of five LED-lens units disposed along a line lying between the first and second high-beam visible-light assemblies 40a 40b, and a second assembly 41b of six LED-lens units lying next to the second high-beam visible-light assembly 40b, on the other side from the first low-beam visible-light assembly 41a. The LED array 28 also includes one assembly 44a consisting of two outermost-lying low-beam IR-light LED-lens units 44, both lying along a line closest to the perimeter of the substrate 12, but diametrically opposite to the first assembly 40a. An additional low-beam IR-light LED-lens unit 44 contiguous with the outermost-lying low-beam IR-light LED assembly 44a is located closer to the center of the substrate 12. Finally, the LED array 28 also includes two high-beam IR-light assemblies 42a 42b comprising of a total of four high-beam IR-light LED-lens units 42, all lying along a line parallel to the first low-beam visible-light LED assembly 41a, but diametrically opposite to that assembly, but with two of the four LED-lens units arranged together in pairs, and the two pairs separated from each other by the more inner-lying low-beam IR-light LED-lens unit 44.

Figure 6:
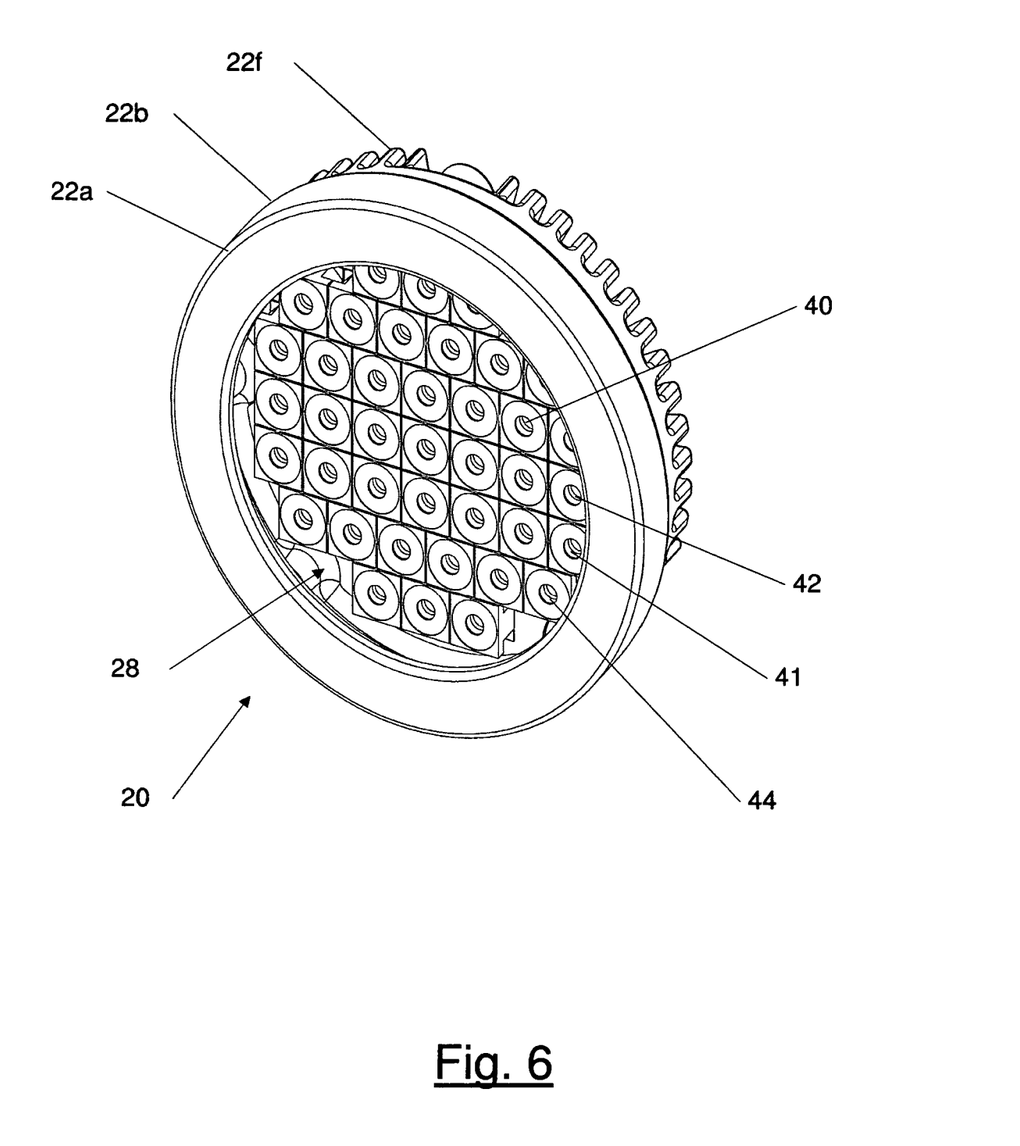
FIG. 6 is a front perspective view showing an LED array for an embodiment of a headlamp system according to the invention.

FIG. 6 is another illustrative embodiment of the invention providing 39 LED-lens units 40 41 42 44 arranged in alternating rows of high and low beam IR LED-lens units and high and low beam white light LED-lens units but it is to be understood that although the embodiments shown in FIGS. 4, 6 and 7 show specific numbers and arrangements of LED-lens units 40 41 42 44 or LEDs 14 with primary and secondary lenses 16 the total number of LED-lens units, LEDs with primary and secondary lenses, and the proportion of IR LED-lens units to visible light LED-lens units and their arrangements will vary according to the size and shape of the housing, as well as to particular desired lighting performance requirements.

Additionally, the spatial arrangement of the LEDs 14 and/or the LED-lens units 40 41 42 44 are not limited to the embodiments described herein. For example, in the embodiment of the headlamp shown more particularly in FIG. 10, the LED-lens units producing high beam visible light 40 may be spatially located in the lower portion and about the periphery of the headlamp housing 22, and LED-lens units producing low beam visible light 41 may be spatially located about the periphery of the upper portion of the headlamp housing 22. Individual fill lights 46a 46b 46c are also provided, each fill light comprising a single LED light source 40d and a cylindrical lens 46d, the lens 46d focusing the light emitted by the LED source (ie. the plurality of dies) 40d into a wide, narrow beam pattern designed. The fill lights are centrally positioned within the housing 22 between the various visible light LED-lens units 40 41. The low and high beam IR LED-lens units 42 44 are located centrally below the fill lights and in the lower portion of the housing. A black filter 62 placed over the IR LED-lens units 42 44 and adjacent to the protective cover 26, filters and thus reduces the red appearance of the light emitted by the IR-LED-lens units 42 44. The filter 62 is transparent only when there is an operational light source behind the filter 62, and is ideally made of polycarbonate, but any other suitable material may be used. In this embodiment, the LEDs used are LED-substrate units comprising a plurality of so-called dies 40d thermally bonded to an aluminum printed circuit board substrate 12, the dies acting as a single LED light source, and where the LED-substrate 12 is fastened to the aluminum housing 22 by the fasteners 34. Thermal compound (thermal grease) is applied between the substrate 12 and the housing 22, to provide for heat flow from the LEDs 40d to the housing 22 and out to the protruding cooling fin elements 22f.

High and low-beam operation are achieved by using different types of lenses in the LED-lens units 40 41 42 44, a lens producing a more collimated beam for high beam operation and a low beam lens to achieve low beam operation. The types of lenses used to produce high and/or low beams may include projector, spot and/or dispersion lenses. Additionally, a shield (not shown) may be provided between the LED used and the lens so as to remove light from the beam pattern and thus act as an aid to the lens used. Additionally, an embodiment of the invention provides for high-beam operation by turning on all the high-beam IR LED-lens units at once for high-beam IR operation, or all the high-beam visible light LED-lens units at once for high-beam visible light operation (but in a typical embodiment, the IR LED-lens units and the visible light LED-lens units cannot be turned on simultaneously). In the embodiment shown more particularly in FIG. 10, fill lights 46a 46b 46c are used in conjunction with the visible white lights 40 41 to create a wider overall beam pattern than what is individually generated by the low and high beam visible lights 40 41. A first fill light 46a and a second fill light 46b are operational for low beam visible light generation, and the second fill light 46b and a third fill light 46c are operational for high beam visible light generation.

Thus, the invention encompasses LED-lens units 40 for providing high beam visible light, LED-lens units 41 for providing low beam visible light, LED-lens units 42 for providing high beam IR light, and LED-lens units 44 for providing low beam IR light. Each of the LED-lens units is shown and described above according to three different embodiments, shown more specifically in FIG. 1, FIG. 4, and FIG. 10, although it should be understood that the invention also encompasses other embodiments. Thus, for example, in the second embodiment, shown more particularly in FIG. 4, each of the LED-lens units 40 41 42 44 encompasses a visible light or IR light LED 14 and a secondary lens 16 selected to generate the desired beam shape.

The three embodiments of the LED-lens units described herein are fully interchangeable, i.e. the LED with the primary lens 14 used in conjunction with the secondary lens 16 and shown in FIG. 4 can be used in the embodiment shown in FIG. 6, and similarly, the LED-lens units 40 41 42 44 can be used in the embodiment shown in FIG. 4, as can the LED-substrate units consisting of a plurality of dies 40d thermally bonded to a printed circuit board substrate 12 shown in FIG. 10. Thus, the term "LED-lens unit" used here is to be understood as referring to any of the three embodiments of LED-lens units shown and described herein, as well as other embodiments.

The optics (i.e. the arrangement of light sources and lenses) provided by a headlamp according to the invention may be provided so as to conform to requirements given in the Federal Motor Vehicle Safety Standard (FMVSS) 108 for vehicle lighting.

The visible light is advantageously a substantially white light. The term "white" in connection with lighting is meant here to indicate light that is visible and apparently white, i.e. not obviously colored, but the term is not meant to otherwise indicate any particular spectrum of light. The terms visible and white are used interchangeably. White light, because it includes light having many different wavelengths, is more reflective than colored light, and so provides superior illumination under most circumstances, which is advantageous for headlamp applications.

The IR LEDs 14 42 44 may have a spectrum substantially centered about one or another wavelength in the infrared. In a typical embodiment, the center wavelength is 880 nm (nanometer), but longer wavelengths may also be used, including e.g. 940 nm. The longer wavelength LED may have the disadvantage of producing less IR illumination per Watt of power consumed, but typically produces less visible light, whereas IR LEDs at 880 nm may produce some (reddish) light at the far end of the visible spectrum in the direction of the infrared.

The IR LEDs used are advantageously high-power gallium aluminum arsenide (GaAlAs) emitters. An exemplary IR LED is provided by Opto Diode Corporation of Newbury Park, Calif., as product number OD-50L, and the 940 nm peak IR LED with part number OD-50L-940 also from Opto-Diode. Each emitter is self-contained in a hermetic package with a total of three electrical connection leads, two cathodes (externally connected), one anode and a lens. Inside the IR LED packaging is a 0.30-inch square semiconductor chip that forms a P-N junction. When this circuit is forward biased, it converts electrical current to photons at a wavelength in the infrared range, and more specifically, at about or about e.g. 940 nm. In one embodiment, the total power output for each IR LED is 50 mW (before any degradation), using 500 mA current draw. Other embodiments provide for higher power output for each IR LED. Suitable IR lens-less LEDs (ie. LEDs lacking an integrated lens), are the 940 nm peak IR LED with part number SFH4231 from OSRAM of Munich, Germany. An example of a suitable LED-substrate unit comprising a plurality of dies 40d thermally bonded to a printed circuit board substrate 12 is made by OSRAM, part no. D1W5 for white light, and SFH4751 for infrared light.

Lenses suitable for use in the LED-lens units are available from Ledil OY of Salo, Finland, using part numbers OSS-RS, OSS-O, *LW (IR low beam) and *LS (IR high beam). Cylindrical lenses suitable for use with the fill lights in FIG. 10 are available from Edmund Optics of Barrington, N.J., part no. NT48363, as are the projector lenses for low beam visible light, part no. NT46661. The projector lenses suitable for the high beam visible light modules in FIG. 10 are available from the Newport Corporation of Irvine, Calif., part no. KPA043. It is understood that the types of LEDs and lenses provided here are merely examples of suitable parts for the headlamp according to the invention, and that suitable LEDs and lenses may be obtained from other manufacturers.

The protective cover 26 shown more particularly in FIGS. 1, 2, 5, and 10 is preferably made of glass or other suitable material, and may be provided with a diamond-like coating (DLC), known in the art for preventing abrasion or other damage to the cover from wind-born sand and dirt.

The headlamp system 20 is preferably airtight, and in such embodiments the housing 22 is provided with valves (not shown) to facilitate air evacuation from the interior of the headlamp and replacement thereof with nitrogen gas or hot air to eliminate condensation on the interior of the headlamp.

Some embodiments of the invention, shown more particularly in FIG. 10, provide for an aiming mechanism 50 comprising a ball and socket arrangement. The socket portion 58 is a hole cut out of the center of an adaptor plate 52. The ball portion of the aiming mechanism is a cup-shaped element 22g fastened to the back side of the base component 22b. The ball portion 22g and the socket portion 58 are configured to allow the ball portion to rotate easily in the socket portion when one or more aiming screws 56 are adjusted. The importance of the center pivot is that by adjusting the headlamp in one direction, the other direction is unaffected. The ability to independently adjust the horizontal and vertical axes is a requirement of FMVSS-108. To achieve this motion, the adapter plate 52 is rigidly mounted to a host vehicle and to the headlamp housing 22. The attachment is made at the top and left side of the housing the aiming screws 56 or other suitable means to provide vertical and horizontal adjustment, respectively. Tightening the top adjustment or aiming screw 56 positions the headlamp upwards, while loosening the adjustment means will position the headlamp downward. A spring 54 is used to maintain tension on the adjustment means where they contact the housing 22. Prior art headlamps also sometimes use a ball and socket arrangement, but movement in a headlamp according to the present invention uses different contact surfaces, so-called heim joints instead of captive nuts, and a different spring configuration.

The headlamp housing (or "can") 22 may be provided so as to have the same outer dimensions and wiring harnesses 60 (FIG. 10) as that of a headlamp according to the prior art (i.e. an incandescent headlamp) used on the HMMWV (High Mobility Multipurpose Wheeled Vehicle), or on the MMPV (Medium Mine Protected Vehicle) or on other so-called tactical military vehicles or civil vehicles. The use of such a housing allows the continued use of current factory mounting provisions, and thus the headlamp 20 can advantageously be provided to be installed as an original headlamp or as a replacement part using the same vehicle wiring harnesses as are now used for the incandescent lamp currently installed. The headlamp 20 can be made interchangeable between different vehicles by using different adapter plates (not shown) to mount the headlamp to the various vehicles. Such a headlamp can be configured so that the same vehicle headlamp switch, high beam switch, and infrared light switch continue to be utilized (not shown). Further, any military headlamp switch can be used to control this system as the master control switch; there is no need to modify or replace the existing switch. Only one wire is required to be run from the infrared light switch wiring harness to the headlamp system 20. This wire plugs directly into the infrared switch wiring harness; therefore no modification to the wiring harness itself is necessary. A total of four wires will connect to each headlamp assembly: three original wires for high beam, low beam, and ground, and the fourth wire from the infrared light switch to switch between white and infrared lighting (not shown). Some vehicles have the ability to further switch between high and low beam IR light, and thus the wiring harness 60 (FIG. 10) shows 5 wires, the fifth wire allowing the operator to switch between high and low beam IR light. In vehicles lacking this feature, only the high beam IR light is available and the fifth wire is left unplugged. The power supply to the headlamp is typically a 24V power supply.

A headlamp according to the invention may also be provided as a kit for replacing an existing headlamp of a vehicle, by removing the original vehicle headlamp assemblies and replacing them with the headlamp system assemblies of the invention. Such a kit would be provided so as to use the same headlamp assembly mounting bolts and factory wiring harnesses 60.

The operation of the headlamp system 20 in a typical embodiment is very much the same as current headlamp and filtered incandescent infrared operations. The vehicle operator uses the factory vehicle headlamp switch, infrared switch, and high beam/low beam selector switch. During normal operation, the white light headlamps are powered on and off with the factory headlamp switch and high beams are operated using the factory high beam/low beam selector switch. For infrared operations, the factory installed infrared switch is turned on. The infrared switch determines whether white lighting or IR lighting is controlled by the headlamp on/off switch and high beam/low beam selector switch. When the infrared light switch is in the on position, the white headlamp system cannot be turned on, but if the headlamp system is already powered on, the white light headlamps automatically turn off and infrared lights on. Infrared high beam and low beam operation is still controlled by the factory high beam/low beam selector switch, as well as on and off controls. If the vehicle does not come with a factory infrared switch, a standard switch can be ordered and installed.

It is to be understood that the arrangements shown and described above and in the attachments are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A headlamp system for a vehicle, comprising:

a housing (22) including a base component (22*b*) having a plurality of protruding cooling fins (22*f*), and a top component (22*a*), the top component affixed to and covering the base component (22*b*);

a planar array (28) of LED-lens units (40 41 42 44) sandwiched between the base component (22*b*) and the top component (22*a*), the LED-lens units (40 41 42 44) disposed in a desired arrangement, at least one of the LED-lens units (40) providing high beam white light, at least one of the LED-lens units (42) providing high beam infrared light, at least one of the LED-lens units (41) providing low beam white light, and at least one of the remaining LED-lens units (44) providing low beam infrared light; and one or more switches electrically configured and connected for controlling operation of the LED-lens units (40 41 42 44);

wherein the cooling fins (22*f*) protruding from the housing (22) are connected by a thermally conducting path to the LED-lens units (40 41 42 44) and the cooling fins and conducting path are such as to provide sufficient heat removal from the LED-lens units by only conduction and radiation.

2. The headlamp of claim 1, wherein the one or more switches comprise headlamp switches electrically configured and connected for controlling on and off operation of the LED-lens units (40 41 42 44), a high-beam switch for selecting a high beam or a low beam, and an infrared switch for switching between white light and infrared light.

3. The headlamp of claim 1, further comprising an aluminum substrate (12) upon which the planar array of LED-lens units are affixed, and the aluminum substrate (12) forms part of the thermally conducting path.

4. The headlamp of claim 1, wherein the LED-lens units (40 41 42 44) comprise one or more lenses so as to provide the high beam and low beam according to a motor vehicle specification.

5. The headlamp of claim 1, wherein both the housing (22) and the cooling fins (22*f*) are aluminum and form part of the thermally conducting path.

6. The headlamp of claim 1, wherein the desired arrangement of LED-lens units (40 41 42 44) is a pattern of alternating rows of high and low beam IR LED-lens units and high and low beam white light LED-lens units.

7. The headlamp of claim 1, wherein the LED-lens units (40 41 42 44) are LED-substrate units and the housing (22) is an aluminum housing, and the LED-substrate units and the housing (22) form part of the thermally conducting path.

8. The headlamp of claim 1, wherein at least one of the LED-lens units (40 41 42 44) comprises a lens-less LED and a lens attached thereto forming an assembly, and the assembly is mounted to an LED-substrate (12).

9. The headlamp of claim 1, wherein at least one of the LED-lens units (40 41 42 44) comprises an LED (14) having a primary lens integral therewith, mounted to an LED substrate (12), and also a secondary lens (16), wherein the secondary lens (16) works in conjunction with the primary lens to create a desired beam pattern.

10. The headlamp of claim 1, wherein at least one of the LED-lens units (40 41 42 44) comprises a plurality of dies (40*d*) thermally bonded to an LED-substrate (12), and a single lens (40*c* 41*c* 42*c* 44*c* 46*d*) in spaced relation to the plurality of dies (40*d*) for forming a beam from light emitted by the plurality of dies.

11. The headlamp of claim 1, further comprising at least one fill light (46*a* 46*b* 46*c*), the at least one fill light comprising a plurality of dies (40*d*) thermally bonded to an aluminum substrate (12), and a single lens (46*d*) in spaced relation to the plurality of dies (40*d*), the light emitted by the plurality of dies (40*d*) serving as a single LED light source, for forming a beam pattern to augment and refine the beam pattern created by the operational LED-lens units (40 41 42 44) so as to meet the requirements of a motor vehicle specification.

* * * * *